Sept. 12, 1961  R. DUNN ET AL  2,999,702
SHAFT SEAL WITH POSITIVE AUTOMATIC SHUT-DOWN FEATURE
Filed Oct. 14, 1959  3 Sheets-Sheet 3
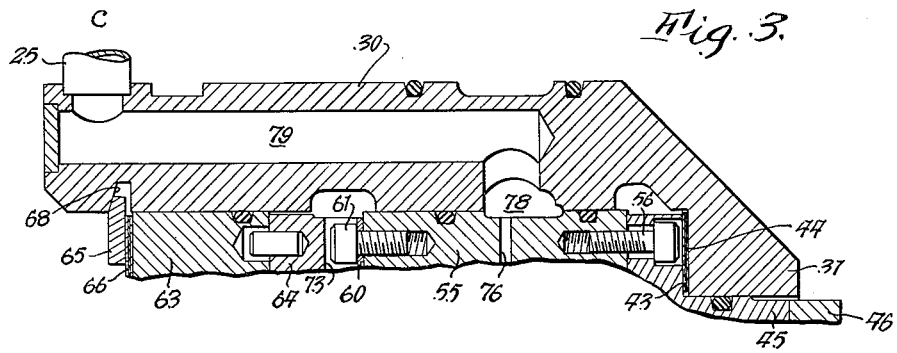
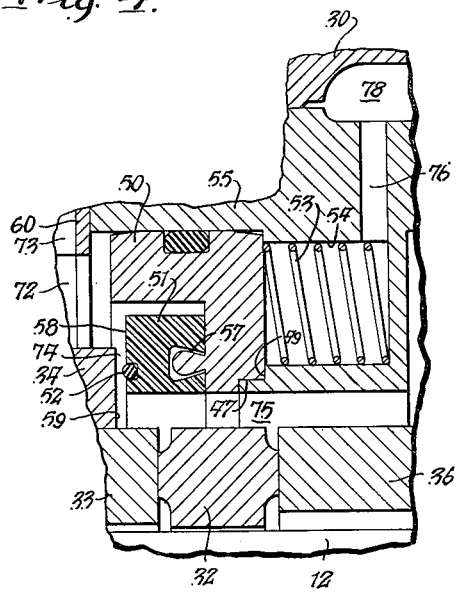
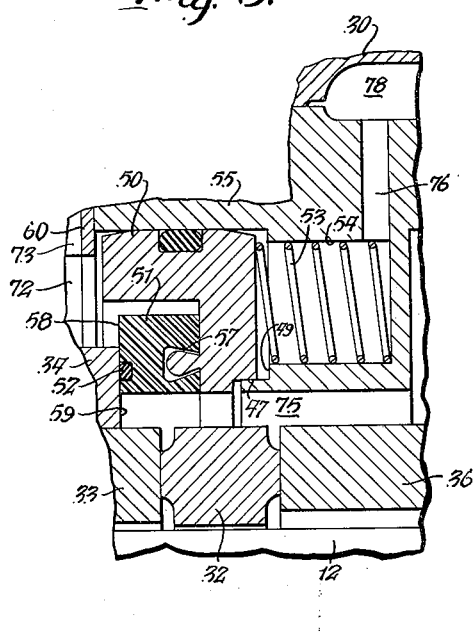
INVENTORS
Robert Dunn
Frederick A. Goerss
BY Popp and Sommer
ATTORNEYS United States Patent Office 2,999,702
Patented Sept. 12, 1961

2,999,702
SHAFT SEAL WITH POSITIVE AUTOMATIC
SHUT-DOWN FEATURE
Robert Dunn, Olean, and Frederick A. Goerss, Allegany,
N.Y., assignors, by mesne assignments, to Dresser Industries, Inc., Dallas, Tex., a corporation of Delaware
Filed Oct. 14, 1959, Ser. No. 846,417
1 Claim. (Cl. 286—8)

This invention relates to improvements in a shaft seal for rotary compressors and the like where there is a differential gas pressure on opposite sides of the seal.

The primary purpose of the present invention is to provide a shaft seal for rotary equipment of the type mentioned which will operate positively and automatically to seal against leakage of the pressurized gas confined by the equipment when the equipment is shut down as occurs when rotation of the shaft ceases.

Another object is to provide such a shaft seal which employs a circulating liquid such as oil as the sealing barrier against the escape of gas but which employs a mechanical sealing barrier if the supply of sealing liquid is intentionally or unintentionally cut off.

A secondary but also important purpose of such invention is to provide such an improved shaft seal which is operative as an emergency seal in the event of failure of another shaft seal of a different type.

Other objects and advantages of the invention will be apparent from the following description and the accompanying drawings in which:

FIG. 3 is a fragmentary, sectional view of the intake seal, similar to FIG. 2, but taken through the seal at a different radial location.

FIG. 4 is an enlarged, fragmentary, sectional view through one side of the annular automatic shut-down seal means forming part of the intake seal assembly shown in FIG. 2 and illustrating such means in its inoperative condition, i.e. no mechanical sealing barrier provided.

FIG. 5 is a view similar to FIG. 4 and showing the seal means in an operative condition where there is a mechanical sealing barrier provided.

Figure 1:
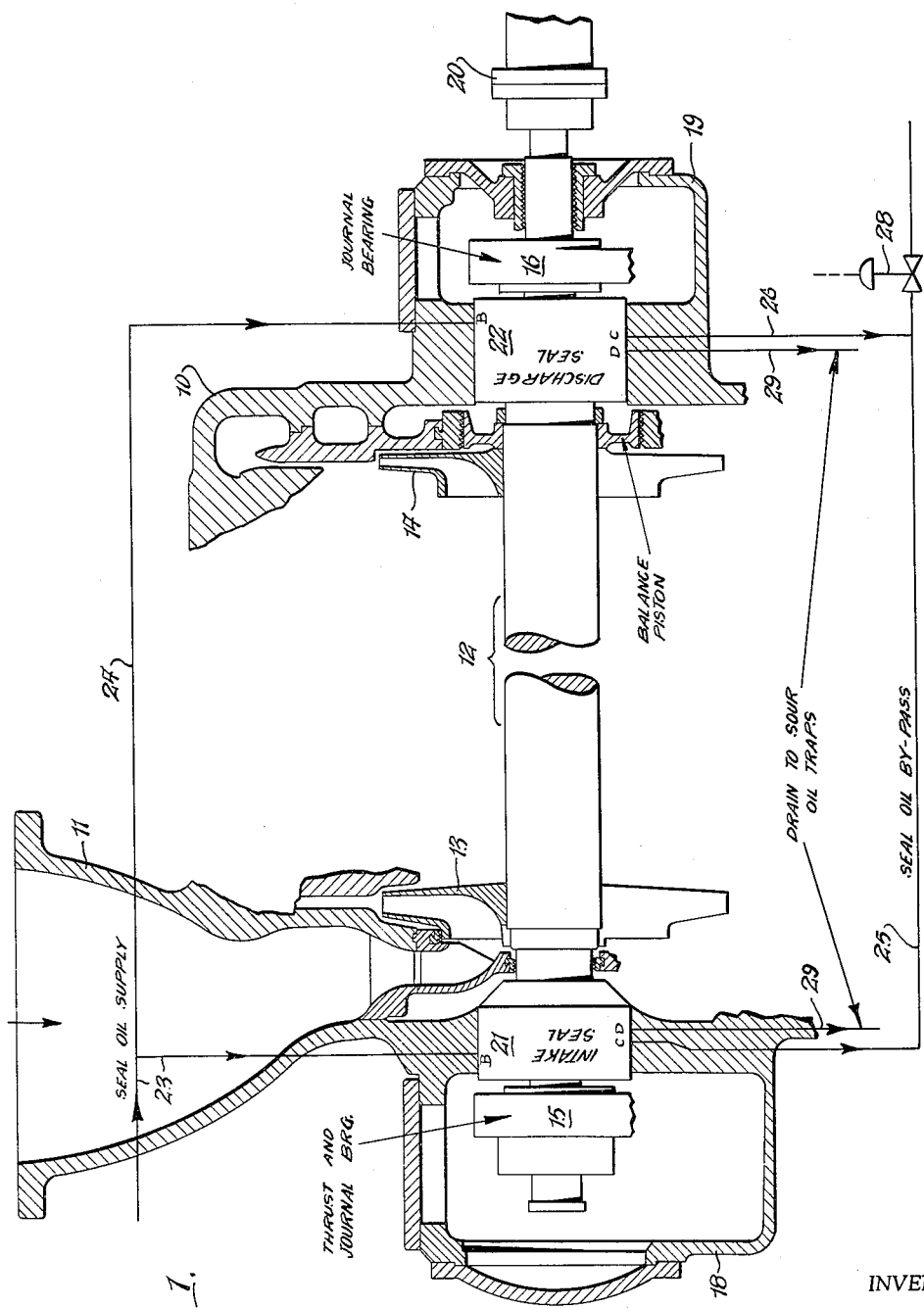
FIG. 1 is a schematic diagram of a rotary compressor having a seal at opposite ends of its shaft and constructed in accordance with the principles of the present invention and showing such seals associated with seal lines.

Referring to FIG. 1, there is depicted a multi-stage rotary type compressor having a casing 10 with an inlet 11 and a horizontal shaft 12 carrying impellers forming the various stages, the first and last of which are shown at 13 and 14, respectively. The shaft 12 has end portions journalled in bearings 15 and 16 supported by the casing at the intake and discharge ends of the compressor, respectively, which are arranged in journal boxes 18 and 19, respectively. The shaft 12 is rotated by driving means (not shown) coupled to one end of the shaft such as the discharge end as is pictorially suggested at 20 in FIG. 1.

Intake and discharge seals 21 and 22, respectively, are provided for the shaft 12 immediately adjacent the corresponding bearing 15 or 16 on the inner side thereof. It is the construction of these seals 21 and 22 to which the present invention is directed. Internally they are similar in construction so that a detailed description of one will suffice.

For a purpose hereinafter explained, a suitable liquid such as oil is supplied under pressure to each of the seals 21 and 22. As shown in FIG. 1, pressurized oil from any suitable source (not shown) is supplied via main line 23 and branch line 24 to a port designated B on each of the seals 21 and 22. Each of the seals 21 and 22 is also provided with a drain port designated C. Such drain port C for the intake seal 21 is shown as connected by a main drain line 25 to a reservoir (not shown), and the corresponding drain port C for the discharge seal 22 is shown as connected to the main drain line 25 via the branch drain line 26. A valve 28 is shown as arranged in the main drain line 25 on the downstream side of the point of mergence with the branch drain line 26. The operation of valve 28 is responsive to the oil pressure in supply line 23. When this pressure is above a predetermined level the valve 28 is open but when the supply oil pressure drops below such predetermined level the valve 28 closes. Each of the seals 21 and 22 is also shown as having a sour oil drain line 29. The lines 29 lead to a sour oil trap (not shown).

Figure 2:
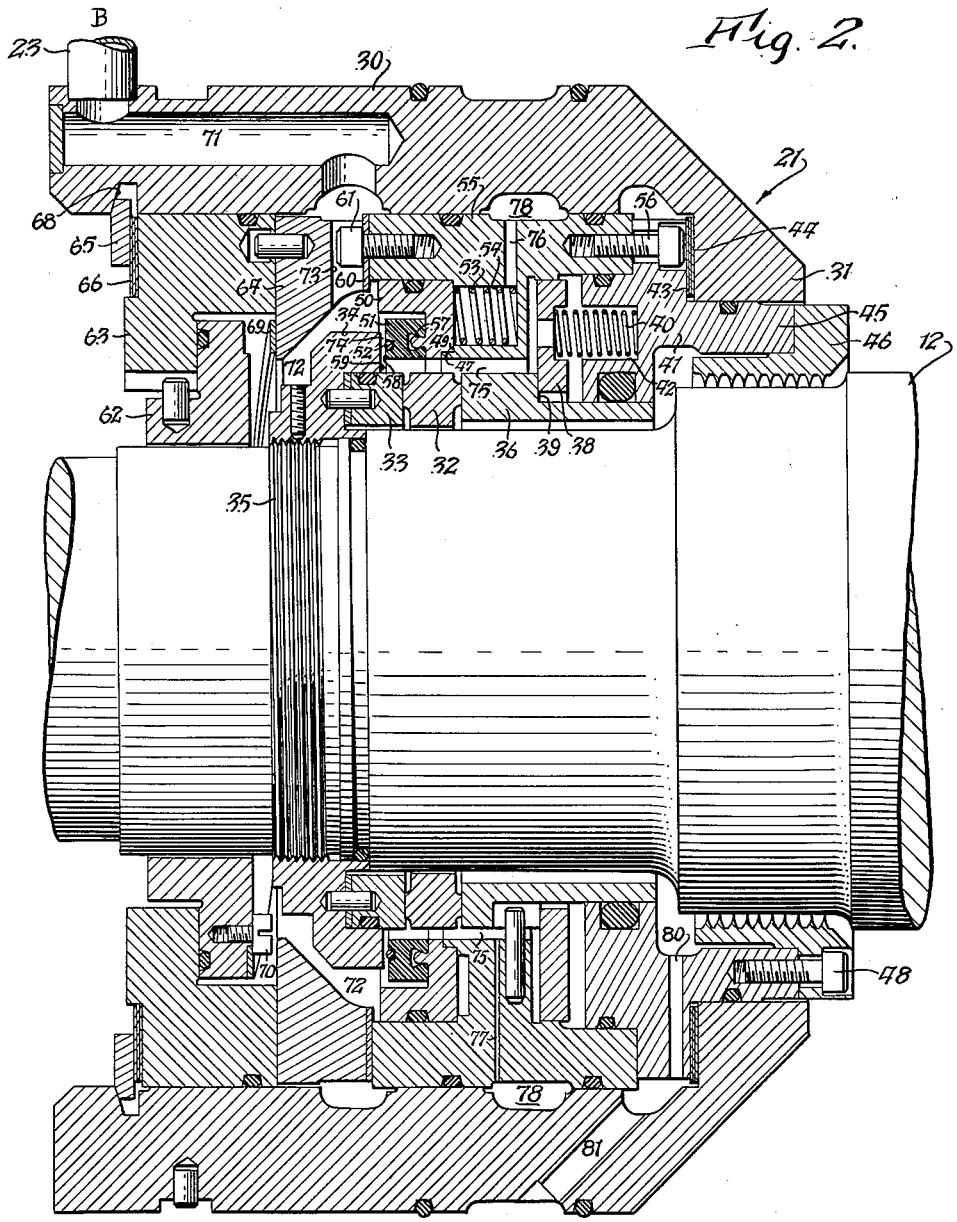
FIG. 2 is an enlarged, vertical, central, sectional view through the intake seal shown in FIG. 1 and showing in elevation that portion of the shaft which extends through the seal assembly.

Referring now to FIG. 2 which is a vertical, central, sectional view through the intake seal 21, the same is shown as having a cartridge 30 of annular form which surrounds the shaft 12 in spaced relation thereto. The inner end of this cartridge has an inwardly projecting, annular flange 31. The cartridge 30 is non-rotatably mounted on the compressor casing 10 in any suitable manner. The compressor casing is not illustrated in FIG. 2.

Housed within the intake seal 21 is mechanism to provide three shaft seals including an inner one, an outer one and an intermediate one, and the shut-down seal forming the subject of the present invention.

A floating seal ring assembly forming the aforesaid intermediate seal is operatively interposed between the shaft 12 and cartridge 30. Such assembly includes the floating ring 32 surrounding the shaft 12 and preferably made of carbon. To one side of the floating ring 32 is an annular rotating seat 33 which is carried by a nut 34 which has a threaded engagement with a portion of the shaft 12 as indicated at 35. An O-ring seals the joint between the nut 34 and shaft 12. Another O-ring is shown as sealing the joint between the seat member 33 and nut 34. On the opposite side of the floating ring 32 is a non-rotative but axially movable ring 36. This ring 36 is urged into engagement with the floating ring 32 by a stop washer 38 bearing against a shoulder 39 formed on the ring 36. This stop washer 38 is biased toward the ring 36 by a series of compression springs 40 arranged at circumferential intervals about the axis of the shaft 12. These springs 40 are backed up by an annular spring housing member 41 which has appropriate recesses as indicated typically at 42 to receive the corresponding end portions of the springs 40. The ring 36 is slidably mounted on the member 41 and the sliding joint therebetween is shown as sealed by an O-ring. The annular spring housing member 41 is shown as having an annular axially-facing shoulder 43 which is arranged opposite the flange portion 31 of the cartridge 30. Annular spacers indicated at 44 are shown as interposed between the shoulder 43 and flange 31.

The spring housing member 41 is shown as having an annular neck 45 which surrounds the shaft 12 in spaced relation thereto but has its outer peripheral face engaging the inner periphery of the flange 31 of the cartridge 30. An O-ring is shown as interposed between the neck 45 and flange 31. Supported by this neck 45 is a labyrinth inner seal member 46 having elements which are operatively associated with a peripheral portion of the shaft to provide an inner seal. This is the inner seal previously referred to. The labyrinth member 46 is shown as connected to the neck portion 45 of the spring housing member 41 by a series of circumferentially spaced screws such as typically shown at 48.

Surrounding the floating seal ring 32 in spaced relation thereto is a shut-down seal assembly which comprises an annular piston 50 carrying a main seal ring 51, in turn carrying an auxiliary seal ring 52. The piston 50 is urged to move to the left as viewed in FIG. 2 by yielding means preferably in the form of a series of circumferentially spaced compression springs typically shown at 53 arranged in recesses 54 provided in an annular shut-down seal spring housing member 55 which is embraced by the cartridge 30. The spring housing member 55 is shown as connected to the other spring housing member 41 by screws 56. A pair of outer O-rings are shown as arranged between the member 55 and cartridge 30. An inner O-ring is shown as arranged between the overlapping portions of the members 41 and 55. An O-ring is shown as sealing the sliding joint between the outer peripheral surface of the piston 50 and its support member 55.

The main contact ring 51 has a radial end face 58 which is arranged opposite to and in overlapping relation with respect to a radial face 59 formed on the nut 34 which rotates with the shaft 12. It is between the faces 58 and 59 that the shut-down seal is effected.

The main contact ring 51 is preferably made of a material having self-lubricating properties. Long chain fluronated polymers of ethylene are suitable for this purpose, in particular tetrafluorethylene which is known in the trade as Teflon. This preferred material does not score or mar and possesses the desired self-lubricating properties. The auxiliary seal ring 52 is a rubber O-ring which is arranged in a groove recessed from the face 58 of the main contact ring 51. While ring 51 might be bonded to piston 50, a dome and recess type of snap connection is preferably employed as shown for mounting the somewhat elastic Teflon ring 51 on the piston 50, as indicated at 57.

As noted above, the piston 50 is axially slidable on the spring housing member 55. Inwardly of the piston 50, there are overlapping annular surfaces on the piston and the spring housing member 55 which provide a sliding joint indicated at 47. An annular, radially extending surface 49 on the spring housing member 55 at one end of the surface thereof forming one element of the sliding joint 47 provides a stop which limits movement of the piston 50 away from the nut 34. The piston is shown engaging the stop 49 in FIGS. 2 and 4. To limit the extent of the piston's movement in a direction toward the nut 34, an annular piston stop 60 is secured to the adjacent end of the housing member 55 by a series of circumferentially spaced screws as shown typically at 61. Any other suitable means of securing the piston stop 60 to the housing member 55 may, of course, be employed. The stop 60 is adapted to be engaged by the piston 50 to limit excessive wear of the ring 51 as will be explained later herein. Also, the stop 60 aids in the assembly of the seal 21.

To the left of the nut 34 fast to the shaft 12 and surrounding the shaft, is an outer seal ring 62. This provides the outer seal previously referred to. Bearing against this ring 62 is an annular seal ring cover 63. The elements 62 and 63 are non-rotatively associated and the joint therebetween is shown as sealed by an O-ring. Inwardly of and engaged by the cover 63 is an annular outer seal housing member 64 which is also non-rotatively associated with the cover 63. The cover 63 is held in fixed axial relation to the cartridge 30 by a retaining ring 65 which through the intermediary of suitable spacers 66 bears against the cover 63 and the outer marginal portion of the retaining ring is wedgingly received in an annular groove 68 formed internally on the cartridge 30. In order to urge the outer seal ring 62 into engagement with the cover 63, there is provided an annular undulating leaf spring member 69 which is secured by a series of circumferentially spaced screws as is typically represented at 70. This spring member 69 has portions bearing against the outer seal housing member 64 and other portions bearing against the outer seal ring 62.

From the foregoing, it will be seen that the seal 21 provides for the shaft 12 an outer seal (ring 62), an inner seal (labyrinth seal 46) and an intermediate seal (floating seal ring 32), and as well a shut-down seal (contact seal ring 51).

When the compressor is operating normally, it is intended that the surface 58 of the contact seal ring 51 be spaced from the opposing surface 59 on the rotating nut member 34. This normal operating condition of the shut-down seal is illustrated in FIGS. 2 and 4. This is achieved by applying a pressurized liquid such as oil against the face of the piston means provided by the elements 50, 51 and 52 so as to urge such means to move in opposition to the urging of the springs 53, or from left to right as viewed in FIG. 2. For this purpose the oil supply line 23 is in communication with a main oil supply passage 71 formed in the cartridge 30 which in turn is in communication with a chamber 72 through the intermediary of a passage 73 provided in the outer seal housing member 64. It will be seen that one wall of the chamber 72 is defined by the piston means of the automatic shut-down seal. Thus, if the pressure of the oil in chamber 72 is sufficiently high, the net force exerted by the oil upon the piston means will drive such means so as to move and maintain the opposing surfaces 58 and 59 away from each other against the urging of the spring means 53 thereby leaving an annular clearance 74.

Between the intermediate and shut-down seal assemblies is an annular chamber 75 which receives seal oil passed by the clearance 74. An annular chamber 78 is formed between the spring shut-down seal spring housing member 55 and the cartridge 30. This chamber 78 is in communication via the passage 79 provided in the cartridge 30 with the main drain line 25. An unrestrictive passage 76 is shown as extending radially outwardly from each spring recess 54 to the annular drain chamber 78. One or more restrictive orifices or passages, one of which is shown typically at 77 in FIG. 2, extends radially outwardly from the chamber 75 to the drain chamber 78. The restricted passages 77 do not intercept the spring recesses 54 and serve to maintain the pressure of the oil in chamber 75. Any oil leaking past the sliding joint 47 into the spring recesses 54 is relieved through the unrestrictive passages 76. Thus a pressure differential can be maintained across the piston 50.

It will be understood that a gas pressure differential obtains across the labyrinth inner seal member 46 with the higher pressure being to the right and the lower pressure being to the left as viewed in FIG. 2. It will also be understood that pressure oil in the chamber 72 provides an oil film seal between the opposing surfaces of the shaft 12 and the outer seal ring 62. Any oil leakage past the outer seal ring 62 is captured by the journal box 18 from which it can be drained and returned for reuse by means not shown. Also pressurized oil within the chamber 75 works along the joints between the floating seal ring 32 and the members 33 and 36 on opposite sides thereof into the peripheral clearance between the opposing surfaces of this floating ring and the shaft 12 so as to produce an effective seal at this location. However, a mixture of oil along the shaft with gas leaked past the labyrinth inner seal member 46 forms sour oil. This can be drained through a radial passage 80 provided in the floating ring spring housing member 41. The passage 80 communicates with a passage 81 provided in the cartridge 30 and this passage 81 is in communication with the sour oil drain line 29 (FIG. 1).

The operation of the automatic shut-down seal to which the present invention is directed can best be understood by referring to FIGS. 4 and 5. As illustrated in FIG. 4 the parts are in the same condition as in FIG. 2. It will be seen that pressurized oil in chamber 72 will urge the piston means 50, 51 and 52 so as to separate the surfaces 58 and 59, against the urging of the spring means 53. The piston means move under this predominant hydraulic force until the piston member 50 mechanically stops against limit surface 49 formed on the spring housing member 55. The passage or clearance 74 thus provided between the spaced apart surfaces 58 and 59 allows oil to flow from the chamber 72 into the chamber 75. Pressure is maintained in chamber 75 by the restrictive orifices or passages 77. Oil within the connected passages 72 and 75 maintains a liquid seal surrounding the intermediate seal ring 32.

When the pressure of the oil in the chamber 72 falls below a predetermined value, the net force of the springs 53 predominates over the net force exerted by the oil in the chamber 72. This will cause the piston means 50, 51 and 52 to move to the left and cause the contact seal ring surface 58 to engage the surface 59 on the nut member 34 carried by the shaft 12, as illustrated in FIG. 5.

The reduction of the oil pressure in the chamber 72 below the predetermined level aforesaid may be occasioned by several causes. It may be intentionally reduced as when the compressor apparatus is shut down. This normally occurs by stopping rotation of the shaft 12 and then turning off the means (not shown) such as an oil pump which would be generating the pressurized oil supplied to the chamber 72. When the supply oil pressure is so reduced below a predetermined value, the valve 28 closes so as to trap oil within the drain lines 25 and 26 and communicating chambers and passages such as 79, 78, 77, 76 and 75. Even when the compressor equipment is so shut down, it must be remembered that there still remains a pressure differential across the labyrinth inner seal member 46. The pressure of the gas will be felt through leakage past the sides of the floating ring seal 32 upon the oil within the chamber 75 and in turn via the communicating passages 77, 78 and 76 within the spring recesses 54. The now predominant net spring force, as implemented by the gas pressurization of the trapped oil within the chambers 75, 78 and 54, will drive the piston 50 so as to move the surface 58 of the contact seal ring 51 into engagement with the opposing non-axially movable surface 59. A seal is effected by engagement of these two surfaces and additionally rendered efficient by reason of the presence of the O-ring 52 which seals the joint between the two surfaces 58 and 59.

In addition to the deliberate turning off of the source of pressurized oil supply, it will also be seen that there can be an unintentional failure of the oil supply pressure in which case the shut-down seal will operate automatically as just described for the case of the intentional shut-down. The only difference is that should the oil supply pressure unintentionally fail when the shaft is rotating, the seal effected between the opposing surfaces 58 and 59 will be such that the surface 59 will be rotating. While it is undesirable for this condition to continue for any extended period of time, it can be accommodated by reason of the composition of the contact seal ring 51 and the fact that the material thereof has self-lubricating properties. Even if it does wear away it will not score or mar the surface 59. In this connection, as the surface 58 wears away, the axial thickness of the contact seal ring 51 reduces. This erosion can proceed sufficiently long that enough of the contact seal ring 51 has eroded such that the outer end face of the piston 50 ultimately engages the piston stop 60. When this engagement of the stop occurs the bias of the springs 53 is removed and there will be no further wear on the surface 58 although the efficiency of the seal may be reduced at this time. Of course, the salient part of the O-ring 52 will wear away before the face 58 of the ring 51.

The automatic shut-down seal assembly has a further advantage, although of secondary importance to the primary purpose described hereinabove. This secondary purpose is that in the event of a failure of the floating seal ring 32 which is made of carbon and which failure sometimes occurs, even through there is no failure of the oil supply pressure, the annular space 74 between the opposing faces 58 and 59 restricts the flow of oil from the chamber 72 into the chamber 75. Failure of the floating seal ring 32 would usually bring about a prompt and deliberate shut-down of the compressor equipment in which case the oil supply pressure 72 would be deliberately reduced causing the shut-down seal to become fully effective by bringing the opposing surfaces 58 and 59 into effective sealing contact as previously described.

From the foregoing, it will be seen that the present invention provides a shaft seal in which a piston means is normally held retracted from engagement with a sealing surface by pressurized liquid as long as the pressure of the liquid is maintained above a predetermined value. Once the pressure falls below this predetermined value, whether by deliberate turning off of the oil supply or by an unintentional failure of the pressurized oil supply system, the seal will become operative automatically to prevent the escape of pressurized gas being handled by the compressor.

What is claimed is:

In a shaft seal, the combination comprising a first member surrounding the shaft and rotatable therewith, a floating seal ring surrounding the shaft and urged into seating engagement with said first member, a stationary member surrounding said floating seal ring, an annular piston slidably mounted on said stationary member for movement in a direction axially of the shaft, a contact seal ring carried by said piston, an annular contact surface on said first member and facing axially of said shaft, spring means operatively interposed between said piston and stationary member for urging said contact seal ring toward engagement with said contact surface, means for applying pressurized liquid to said piston to urge separation between said contact seal ring and said contact surface, and drainage means for removing fluid by-passed by said seal rings, said contact seal ring and contact surface being normally separated but engaging when the forces urging them together exceed those urging them apart such as when the pressure of said liquid falls below a predetermined value.

References Cited in the file of this patent

FOREIGN PATENTS

| 2,308,149 | Bingham | Jan. 12, 1943 |
| 2,738,208 | Mylander | Mar. 13, 1956 |
| 2,768,011 | Mosher | Oct. 23, 1956 |
| 2,831,712 | Kurti | Apr. 22, 1958 |
| 2,881,014 | Amirault et al. | Apr. 7, 1959 |